US012449624B2

(12) United States Patent
Lin (10) Patent No.: US 12,449,624 B2
(45) Date of Patent: Oct. 21, 2025

(54) DEVICE AND METHOD FOR AUTOMATICALLY ADJUSTING INTERPUPILLARY DISTANCE (IPD) COMPRISING FIRST AND SECOND OPTICAL MODULES SLIDABLY PROVIDED ON A BASE

(71) Applicant: AAC Acoustic Technologies (Shanghai) Co., Ltd., Shanghai (CN)

(72) Inventor: Qinghua Lin, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 343 days.

(21) Appl. No.: 18/342,691

(22) Filed: Jun. 27, 2023

(65) Prior Publication Data

US 2024/0329351 A1     Oct. 3, 2024

Related U.S. Application Data

(63) Continuation of application No. PCT/CN2023/092627, filed on May 7, 2023.

(30) Foreign Application Priority Data

Mar. 31, 2023    (CN) .......................... 202310348216.6

(51) Int. Cl.
    *G02B 7/00*       (2021.01)
    *G02B 27/00*     (2006.01)
    *G06F 1/16*      (2006.01)
(52) U.S. Cl.
    CPC ......... *G02B 7/005* (2013.01); *G02B 27/0093* (2013.01); *G06F 1/163* (2013.01)

(58) Field of Classification Search
    CPC ....................................................... G02B 7/005
    See application file for complete search history.

(56) References Cited

U.S. PATENT DOCUMENTS

| | | | | |
|---|---|---|---|---|
| 2016/0320612 A1* | 11/2016 | Zhang | .................. | G02B 27/017 |
| 2018/0213212 A1* | 7/2018 | Liu | ...................... | H04N 13/344 |
| 2020/0271935 A1* | 8/2020 | Weber | ................ | G02B 27/0955 |

FOREIGN PATENT DOCUMENTS

| | | | | | |
|---|---|---|---|---|---|
| CN | 110109250 A | * | 8/2019 | ............... | G02B 7/04 |
| CN | 112180609 A | * | 1/2021 | ......... | G02B 27/0176 |

\* cited by examiner

*Primary Examiner* — Paul C Lee
(74) *Attorney, Agent, or Firm* — Wiersch Law Group (57) ABSTRACT

Provided a device and method for automatically adjusting an interpupillary distance (IPD) capable of achieving a desirable automatic VR IPD adjustment effect. The device includes a base, first and second optical modules, a pupil position acquisition assembly, a transmission assembly, an IPD adjustment driving circuit, and a processor. Two ends of the transmission assembly are respectively rotatably connected to a side of the first optical module adjacent to the base and a side of the second optical module adjacent to the base. The processor is electrically connected to the IPD adjustment driving circuit and the pupil position acquisition assembly. The adjustment driving circuit receives IPD position information, and causes the transmission assembly to drive the first optical module and the second optical module to move close to or away from each other to adjust a distance between the first optical module and the second optical module.

10 Claims, 7 Drawing Sheets

```
┌─────────────────────────────────────────────────────────────┐
│ Receive, by the processor, a first pupil image acquired by  │
│ the first pupil position collector and a second pupil image │── S1
│ acquired by the second pupil position collector, and convert│
│ the first pupil image and the second pupil image into       │
│ adjustment driving information                              │
└─────────────────────────────────────────────────────────────┘
                              │
┌─────────────────────────────────────────────────────────────┐
│ Transmit the adjustment driving information to the IPD      │── S2
│ adjustment driving circuit                                  │
└─────────────────────────────────────────────────────────────┘
                              │
┌─────────────────────────────────────────────────────────────┐
│ Drive, by the IPD adjustment driving circuit, the           │── S3
│ transmission component to work                              │
└─────────────────────────────────────────────────────────────┘
                              │
┌─────────────────────────────────────────────────────────────┐
│ Drive, by the transmission component, the worm to rotate,   │
│ where the worm drives the worm wheel to rotate, and the     │
│ worm wheel drives the first connecting rod and the second   │
│ connecting rod to make a push-pull reciprocating motion,    │── S4
│ such that the first optical module and the second optical   │
│ module slide with respect to each other along the adjusting │
│ shafts to move close to or away from each other to adjust   │
│ an IPD between the first optical module and the second      │
│ optical module, and realize IPD adjustment                  │
└─────────────────────────────────────────────────────────────┘
                              │
┌─────────────────────────────────────────────────────────────┐
│ Control, by the processor, the transmission component to    │
│ stop when the first and second pupil images outputted by    │── S5
│ the pupil position collectors reach a preset definition     │
└─────────────────────────────────────────────────────────────┘
```

FIG. 7

DEVICE AND METHOD FOR AUTOMATICALLY ADJUSTING INTERPUPILLARY DISTANCE (IPD) COMPRISING FIRST AND SECOND OPTICAL MODULES SLIDABLY PROVIDED ON A BASE

TECHNICAL FIELD

The present invention relates to the technical field of smart wearable virtual reality (VR) devices, and in particular to a device and a method for automatically adjusting an interpupillary distance (IPD).

BACKGROUND

With the progresses of network technologies, electronic information technologies, and games, various VR devices and augmented reality (AR) devices are developed. Higher sensory requirements are imposed on external devices by users. VR glasses, also referred to as a VR headset or a VR head-mounted display (HMD), give the user a feeling of being in a virtual environment by blocking external visual and auditory senses from the user.

Conventionally, the IPD in various VR glasses is adjusted manually. A distance between the optical modules is adjusted by pushing the optical modules by user's hand. Conventional VR glasses is switched between three IPD settings and thus is applicable to users with different IPDs.

However, the push button or rotary button for manually adjusting the IPD is not aesthetically-pleasing to the product, and makes the product assembled more difficultly. For the VR glasses with three IPD settings, the user selects one IPD setting close to the IPD of the user. However, the IPDs of some users do not well match any one of the three IPD settings, affecting the user experiences.

Therefore, it is necessary to provide a novel device and method for automatically adjusting the IPD.

SUMMARY

A device and method for automatically adjusting an IPD are provided. The device and method have a desirable automatic VR IPD adjustment effect, a high picture definition, an aesthetically-pleasing appearance, a wide application range and a good user experience.

According to an aspect, embodiments of the present disclosure provide a device for automatically adjusting an IPD. The device is applied to VR glasses and includes a base, a first optical module slidably provided on the base, a second optical module slidably provided on the base, a pupil position acquisition assembly, a transmission assembly, an IPD adjustment driving circuit, and a processor.

The transmission assembly is supported on the base, rotatably connected to the base, and located between the first optical module and the second optical module. The transmission assembly includes a first end rotatably connected to a side of the first optical module adjacent to the base and a second end rotatably connected to a side of the second optical module adjacent to the base. The processor is electrically connected to the IPD adjustment driving circuit and the pupil position acquisition assembly, and the IPD adjustment driving circuit is electrically connected to the transmission assembly.

The pupil position acquisition assembly is configured to acquire a pupil image displayed by the first optical module and the second optical module, and transmit the pupil image to the processor. The processor is configured to receive the pupil image and compute pupil positions, pupil sizes and IPD position information. The adjustment driving circuit is configured to receive the IPD position information from the processor, and cause the transmission assembly to drive the first optical module and the second optical module to move close to or away from each other on the base to adjust an IPD between the first optical module and the second optical module, and realize IPD adjustment.

As an improvement, the pupil position acquisition assembly includes a first pupil position acquisition unit fixed to the first optical module and a second pupil position acquisition unit fixed to the second optical module, the pupil image includes a first pupil image displayed by the first optical module and a second pupil image displayed by the second optical module, the first pupil position acquisition unit is configured to acquire the first pupil image and transmit the first pupil image to the processor, and the second pupil position acquisition unit is configured to acquire the second pupil image and transmit the second pupil image to the processor.

As an improvement, the base includes a base body and a plurality of fixing members protruding and extending from the base body in a direction toward the first optical module and the second optical module. The first optical module includes a first optical unit and a plurality of first sliding seats fixed to a side of the first optical unit adjacent to the base and spaced apart from one another. The second optical module includes a second optical unit and a plurality of second sliding seats fixed to a side of the second optical unit adjacent to the base and spaced apart from one another.

The automatic IPD adjusting device further includes adjusting shafts extending along a movement direction of the first optical module and the second optical module and are opposite to each other, the adjusting shafts pass through the plurality of the fixing members and are fixedly supported by the plurality of the fixing members, and the plurality of first sliding seats and the plurality of second sliding seats are sleeved on and slidably connected to the adjusting shafts.

As an improvement, the transmission assembly includes a transmission component fixed to the base, a worm wheel rotatably provided on the base, a first connecting post and a second connecting post protruding from a side of the worm wheel away from the base and spaced apart from each other, a first connecting rod, and a second connecting rod. The transmission component is in transmission connection with the worm wheel, the first connecting rod includes a first end connected to the first connecting post and a second end connected to a side of the first optical module adjacent to the base, and the second connecting rod includes a first end connected to the second connecting post and a second end connected to a side of the second optical module adjacent to the base.

As an improvement, a connecting position at the second end of the first connecting rod and a connecting position at the second end of the second connecting rod are located on a straight line parallel to the adjusting shafts.

As an improvement, the first connecting post and the second connecting post are symmetric with respect to a center of the worm wheel.

As an improvement, the transmission component includes a drive unit fixed to the base, and a worm fixedly connected to an output end of the drive unit, where the worm is engaged with the worm wheel.

As an improvement, the base further includes an avoiding slot penetrating the base, and wherein a side of the worm adjacent to the base is suspended in the avoiding slot.

As an improvement, the first optical unit includes: a first display assembly, a first barrel holder fixed to a side of the first display assembly away from the base, a first lens set fixed in the first barrel holder, a first adjusting ring sleeved on the first barrel holder, and a first infrared light ring fixedly covering a side of the first barrel holder away from the base.

The second optical unit includes: a second display assembly, a second barrel holder fixed to a side of the second display assembly away from the base, a second lens set fixed in the second barrel holder, a second adjusting ring sleeved on the second barrel holder, and a second infrared light ring fixedly covering a side of the second barrel holder away from the base.

According to another aspect, embodiments of the present disclosure provide a method for automatically adjusting an IPD. The method is applied to the device for automatically adjusting an IPD and includes the following steps:

receiving, by the processor, a first pupil image acquired by the first pupil position acquisition unit and a second pupil image acquired by the second pupil position acquisition unit, and converting, by the processor, the first pupil image and the second pupil image into adjustment driving information;

transmitting the adjustment driving information to the IPD adjustment driving circuit;

driving, by the IPD adjustment driving circuit, the transmission component to work;

driving, by the transmission component, the worm to rotate, where the worm drives the worm wheel to rotate, and the worm wheel drives the first connecting rod and the second connecting rod to make a push-pull reciprocating motion, such that the first optical module and the second optical module slide with respect to each other along the adjusting shafts to move close to or away from each other to adjust an IPD between the first optical module and the second optical module, and realize IPD adjustment; and controlling, by the processor, the transmission component to stop when the first and second pupil images outputted by the pupil position acquisition units reaches a preset definition.

According to the device for automatically adjusting an IPD provided by the present disclosure, two ends of the transmission assembly are rotatably connected to a side of the first optical module adjacent to the base and a side of the second optical module adjacent to the base, respectively. The processor is electrically connected to the IPD adjustment driving circuit and the pupil position acquisition assembly. The IPD adjustment driving circuit is electrically connected to the transmission assembly. The pupil position acquisition assembly is configured to acquire a pupil image displayed by the first optical module and the second optical module, and transmit the pupil image to the processor. The processor is configured to receive the pupil image and compute pupil positions, pupil sizes and IPD position information. The adjustment driving circuit is configured to receive the IPD position information from the processor, and drive the transmission component. In this way, the transmission component drives the first optical module and the second optical module to move close to or away from each other on the base to adjust an IPD between the first optical module and the second optical module, and realize IPD adjustment. In the field of smart wearable VR devices, the device for automatically adjusting an IPD is suitable for all users. The smart wearable VR device is provided with no IPD adjusting button such as a push button or a pull button. The integrity of the appearance of the smart wearable VR device is improved, and the assembly difficulty of the smart wearable VR device is reduced. Meanwhile, for different users, the device performs adjustment automatically. It can quickly determine the IPD of the user and make quick and automatic adaptations for the different IPDs, thereby improving picture imaging to left and right eyes and achieving a better user experience.

BRIEF DESCRIPTION OF DRAWINGS

In order to more clearly illustrate the technical solutions in the embodiment of the present disclosure, the drawings used in the description of the embodiment will be briefly described below. It is obvious that the drawings in the following description are only some embodiments of the present disclosure. For those skilled in the art, other drawings can be obtained according to these drawings without creative efforts.

Reference signs: 100: device for automatically adjusting an IPD, 1: base, 11: base body, 12: fixing member, 13: avoiding slot, 2: first optical module, 21: first optical unit, 211: first display assembly, 212: first barrel holder, 213: first lens set, 214: first adjusting ring, 215: first infrared light ring, 22: first sliding seat, 3: second optical module, 31: second optical unit, 311: second display assembly, 312: second barrel holder, 313: second lens set, 314: second adjusting ring, 315: second infrared light ring, 32: second sliding seat, 4: first pupil position acquisition unit, 5: second pupil position acquisition unit, 6: transmission component, 61: worm, 7: transmission assembly, 71: worm wheel, 72: first connecting post, 73: second connecting post, 74: first connecting rod, 75: second connecting rod, 8: adjusting shaft, 9: guide slot, 10: sealing ring, 111: limiting slot, and 20: pupil position acquisition assembly.

DETAILED DESCRIPTION

The technical solutions of the embodiments of the present disclosure are clearly and completely described below with reference to the drawings. Apparently, the described embodiments are merely some rather than all of the embodiments of the present disclosure. All other embodiments obtained by those of ordinary skill in the art based on the embodiments of the present disclosure should fall within the protection scope of the present disclosure.

Embodiment 1

Referring to FIGS. 1-6, a device 100 for automatically adjusting IPD is provided, the device 100 may be applied to VR glasses. The device 100 includes a base 1, a first optical module 2 slidably provided on the base 1, and a second optical module 3 slidably provided on the base 1. The base 1 is configured to support the first optical module 2 and the second optical module 3. The first optical module 2 and the second optical module 3 are configured to acquire image data. The device 100 for automatically adjusting IPD further includes a pupil position acquisition assembly 20, a transmission assembly 7, an IPD adjustment driving circuit, and a processor (not shown in the figures). The transmission assembly 7 is supported on the base 1, rotatably connected to the base 1, and located between the first optical module 2 and the second optical module 3. The transmission assembly 7 includes a first end rotatably connected to a side of the first optical module 2 adjacent to the base 1 and a second end rotatably connected to a side of the second optical module 3 adjacent to the base 1. The processor is electrically connected to the IPD adjustment driving circuit and the pupil position acquisition assembly 20. The IPD adjustment driving circuit is electrically connected to the transmission assembly 7.

The pupil position acquisition assembly 20 is configured to acquire a pupil image displayed by the first optical module 2 and the second optical module 3, and transmit the pupil image to the processor.

The processor is configured to receive the pupil image and compute pupil positions, pupil sizes, and IPD position information.

The adjustment driving circuit is configured to receive the IPD position information from the processor, and cause the transmission assembly 7 to drive the first optical module 2 and the second optical module 3 to move close to or away from each other on the base 1 to adjust an IPD between the first optical module 2 and the second optical module 3 and realize IPD adjustment. In the field of intelligent wearable VR devices, the device 100 for automatically adjusting IPD is suitable for all users. Without an IPD adjusting button such as a push button or a pull button on the appearance of the intelligent wearable VR device, the appearance integrity of the intelligent wearable VR device is improved, and the assembly difficulty of the intelligent wearable VR is reduced. Meanwhile, for different users, the device can quickly determine the IPD of the user and make quick and automatic adaptations for the different IPDs, thereby improving imaging qualities of left and right eyes and achieving a better user experience.

In some embodiments, the pupil position acquisition assembly 20 includes a first pupil position acquisition unit 4 fixed to the first optical module 2 and a second pupil position acquisition unit 5 fixed to the second optical module 3. The pupil image includes a first pupil image displayed by the first optical module 2 and a second pupil image displayed by the second optical module 3.

The first pupil position acquisition unit 4 is configured to acquire the first pupil image and transmit the first pupil image to the processor. The second pupil position acquisition unit 5 is configured to acquire the second pupil image and transmit the second pupil image to the processor. The first pupil position acquisition unit 4 and the second pupil position acquisition unit 5 respectively acquire the first pupil image displayed by the first optical module 2 and the second pupil image displayed by the second optical module 3, and transmit the first pupil image and the second pupil image to the processor. The processor is configured to receive the first pupil image and the second pupil image, and compute pupil positions, pupil sizes and IPD position information. The adjustment driving circuit is configured to receive the IPD position information from the processor, and drive the transmission component, thereby driving the first optical module 2 and the second optical module 3 to move close to or away from each other on the base 1 to adjust an IPD between the first optical module 2 and the second optical module 3, and realize IPD adjustment.

In some embodiments, the base 1 includes a base body 11, and a plurality of fixing members 12 protruding and extending from the base body 11 in a direction toward the first optical module 2 and the second optical module 3. The first optical module 2 includes a first optical unit 21, and a plurality of first sliding seats 22 fixed to a side of the first optical unit 21 adjacent to the base 1 and spaced apart from one another. The second optical module 3 includes a second optical unit 31, and a plurality of second sliding seats 32 fixed to a side of the second optical unit 31 adjacent to the base 1 and spaced apart from one another.

Figure 1:
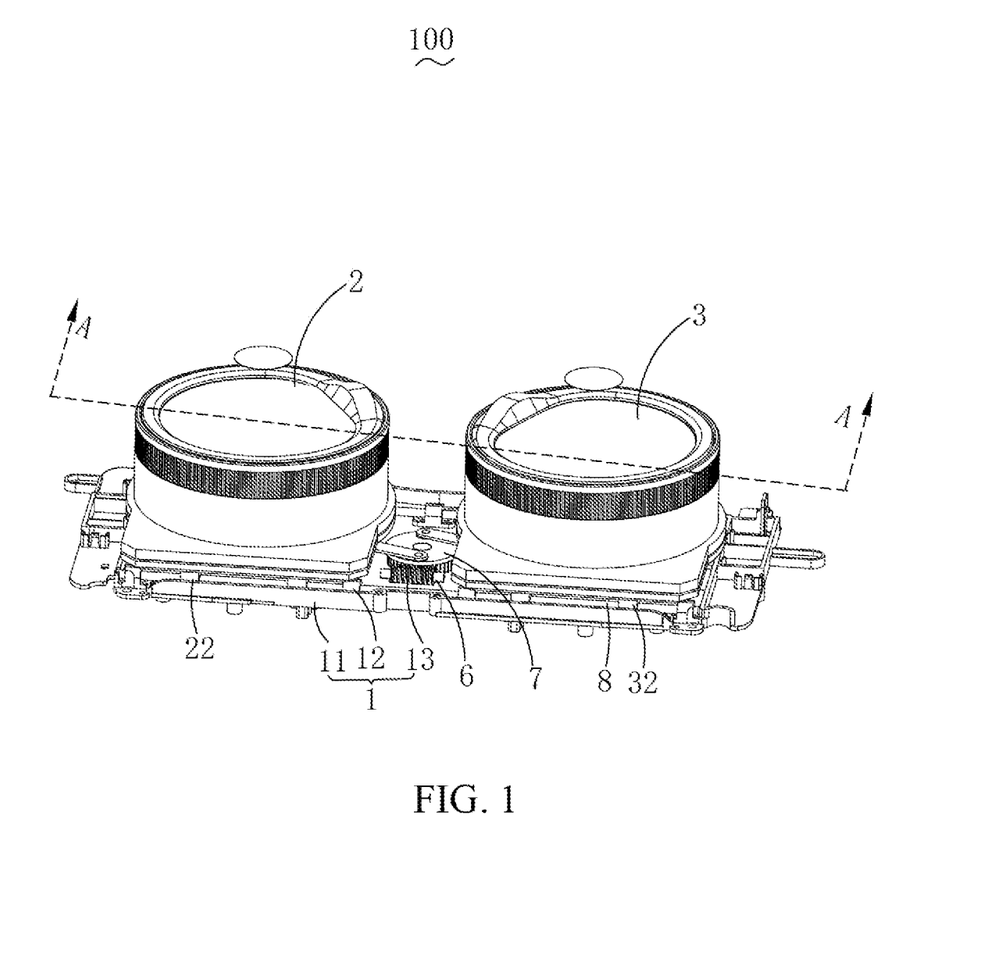
FIG. 1 is a schematic structural view of a device for automatically adjusting an IPD according to the present disclosure.
Figure 2:
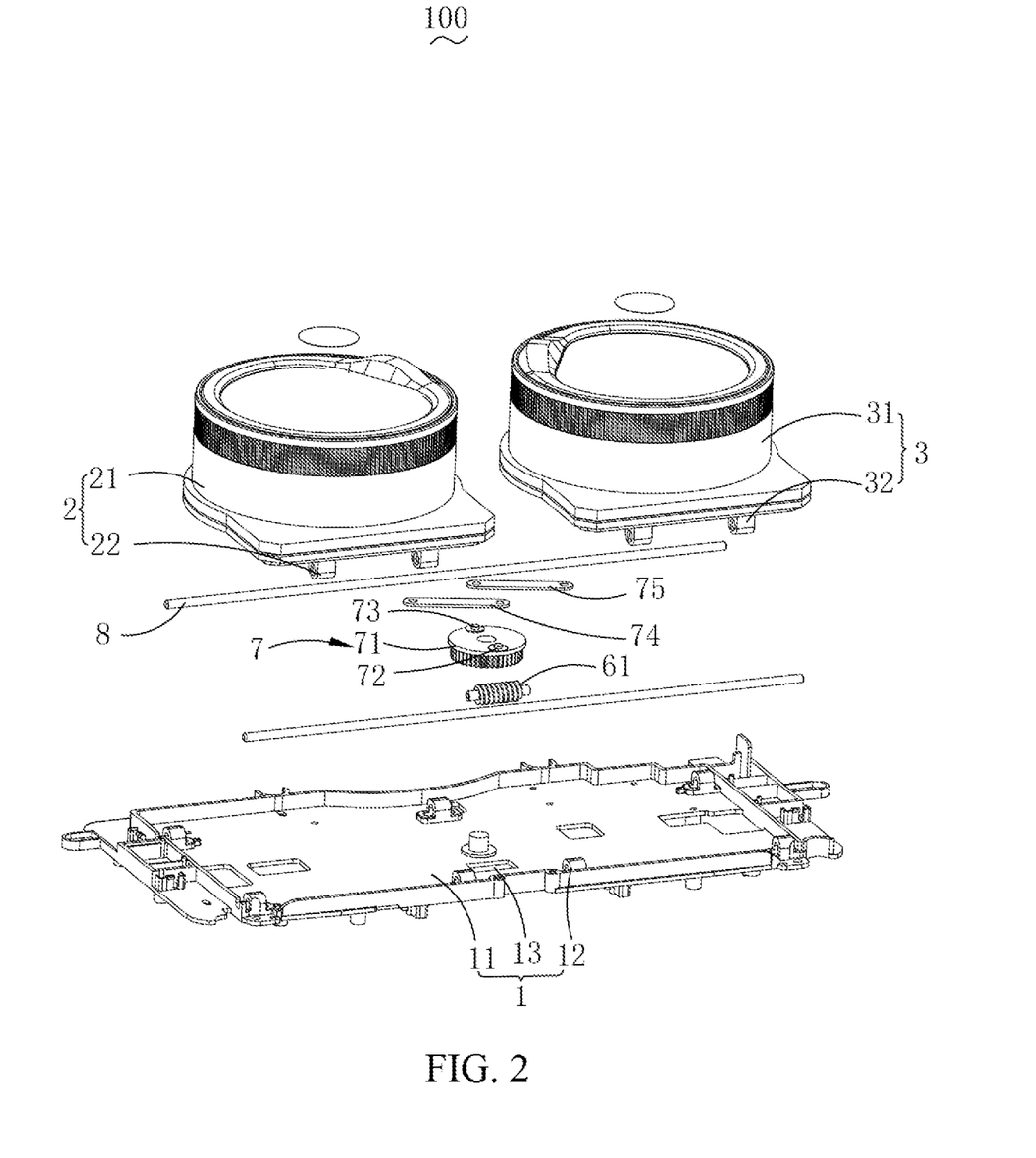
FIG. 2 is an exploded view of the device in FIG. 1.
Figure 3:
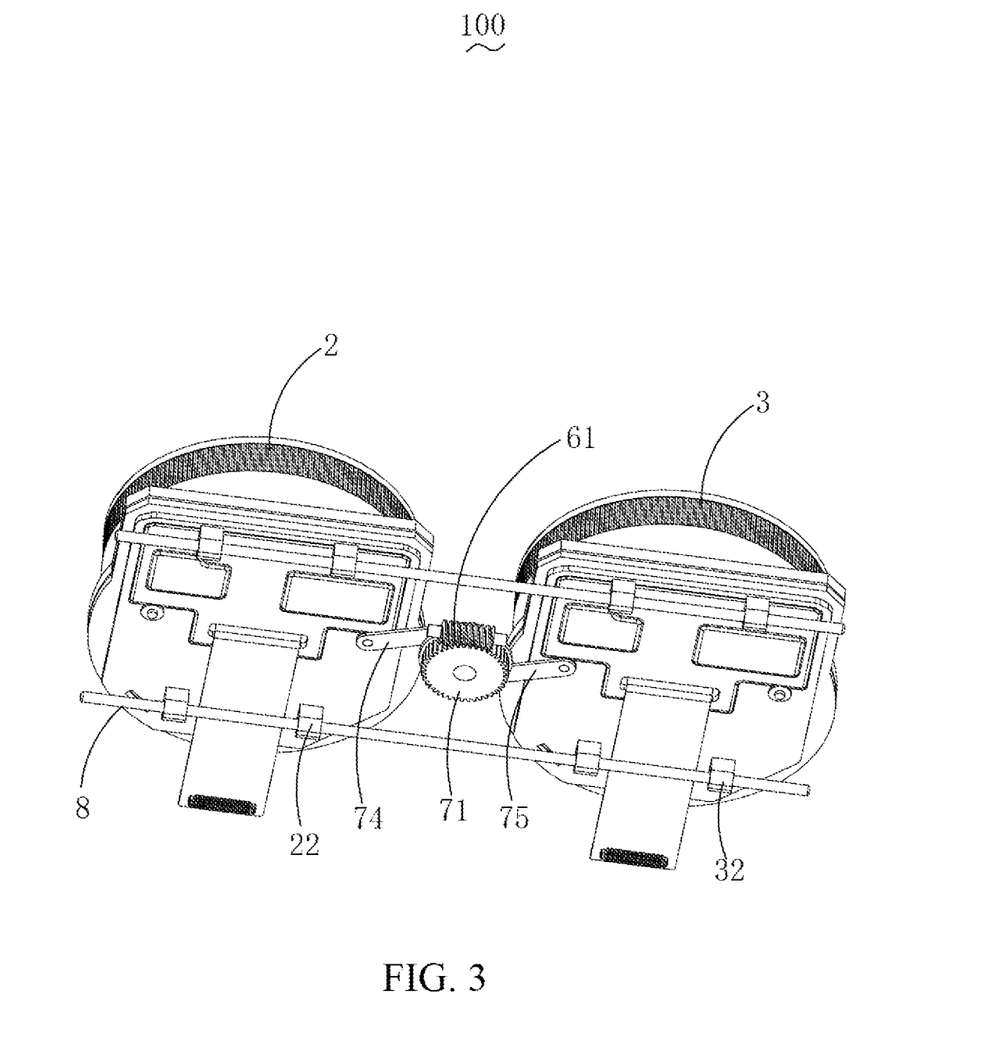
FIG. 3 is a schematic structural view of a device for automatically adjusting an IPD without a base according to the present disclosure.

The device 100 for automatically adjusting IPD 100 further includes adjusting shafts 8 that are opposite to each other and extend along a movement direction of the first optical module 2 and the second optical module 3. The adjusting shaft 8 passes through the corresponding fixing members 12, and is fixedly supported by the corresponding fixing members 12. The plurality of first sliding seats 22 and the plurality of second sliding seats 32 are sleeved on the adjusting shafts 8, and are slidably connected to the adjusting shafts 8. The fixing members 12 are fixedly connected to the adjusting shafts 8. The first sliding seats 22 and the second sliding seats 32 are respectively slidably connected to the adjusting shafts 8. Therefore, the first optical module 2 and the second optical module 3 have a small frictional force in a sliding process, and the distance between the first optical module 2 and the second optical module 3 is adjusted conveniently. The transmission assembly 7 drives the first optical module 2 and the second optical module 3 to slide back and forth along the adjusting shafts 8 on the base 1. This can quickly determine the IPD of the user and make quick and automatic adaptation for different IPDs, thereby realizing picture imaging of left and right eyes, and achieving a better user experience.

Specifically, the plurality of fixing members 12 include two groups, one group includes three fixing members located on a same straight line, and the other group includes four fixing members located on another same straight line. The plurality of first sliding seats 22 include four first sliding seats 22, two of the four first sliding seats 22 are formed into one group and spaced apart, and the other two of the four first sliding seats 22 are formed into one group and spaced apart. The plurality of second sliding seats 32 include four second sliding seats 32, two of the four second sliding seats 32 are formed into one group and spaced apart, and the other two of the four second sliding seats 32 are formed into one group and spaced apart.

Specifically, the adjusting shafts 8 are made of steel, with a high structural strength and a long service life.

In some embodiments, the transmission assembly 7 includes a transmission component 6 fixed to the base 1, a worm wheel 71 rotatably provided on the base 1, a first connecting post 72 and a second connecting post 73 protruding from a side of the worm wheel 71 away from the base 1 and spaced apart from each other, a first connecting rod 74, and a second connecting rod 75. The transmission component 6 is in transmission connection with the worm wheel 71. The first connecting rod 74 includes a first end connected to the first connecting post 72, and a second end connected to a side of the first optical module 2 adjacent to the base 1. The second connecting rod 75 includes a first end connected to the second connecting post 73, and a second end connected to a side of the second optical module 3 adjacent to the base 1. The transmission component 6 drives the worm wheel 71 to rotate, such that the first connecting rod 74 and the second connecting rod 75 on the worm wheel 71 move accordingly. The first connecting rod 74 and the second connecting rod 75 pull or push the first optical module 2 and the second optical module 3, respectively. In this way, the first optical module 2 and the second optical module 3 move close to or away from each other, thereby realizing automatic IPD adjustment between the first optical module 2 and the second optical module 3.

In some embodiments, a connecting position at the second end of the first connecting rod 74 and a connecting position at the second end of the second connecting rod 75 are located on a same straight line parallel to the adjusting shafts 8. In this way, when the transmission component 6 drives the worm wheel 71 to rotate, the first optical module 2 and the second optical module 3 move synchronously, and have a same movement position and a same movement distance.

In some embodiments, the first connecting post 72 and the second connecting post 73 are symmetric with respect to a center of the worm wheel 71. This ensures that the first connecting rod 74 and the second connecting rod 75 have a same movement position and a same movement distance in the rotation of the worm wheel 71.

In some embodiments, the transmission component 6 includes a drive unit fixed to the base 1, and a worm 61 fixedly connected to an output end of the drive unit. The worm 61 is engaged with the worm wheel 71. The drive unit drives the worm 61 to rotate, thereby driving the worm wheel 71 to rotate, and causing the first connecting rod 74 and the second connecting rod 75 to make a push-pull reciprocating motion in the left-right direction. The first connecting rod 74 and the second connecting rod 75 respectively push or pull the first optical module 2 and the second optical module 3 to move along the adjusting shafts 8, thus realizing an automatic IPD adjusting function.

In some embodiments, the base 1 further includes an avoiding slot 13 penetrating through the base 1. A side of the worm 61 adjacent to the base 1 is suspended in the avoiding slot 13. This facilitates avoidance of the worm 61, and saves the overall mounting space.

Figure 4:
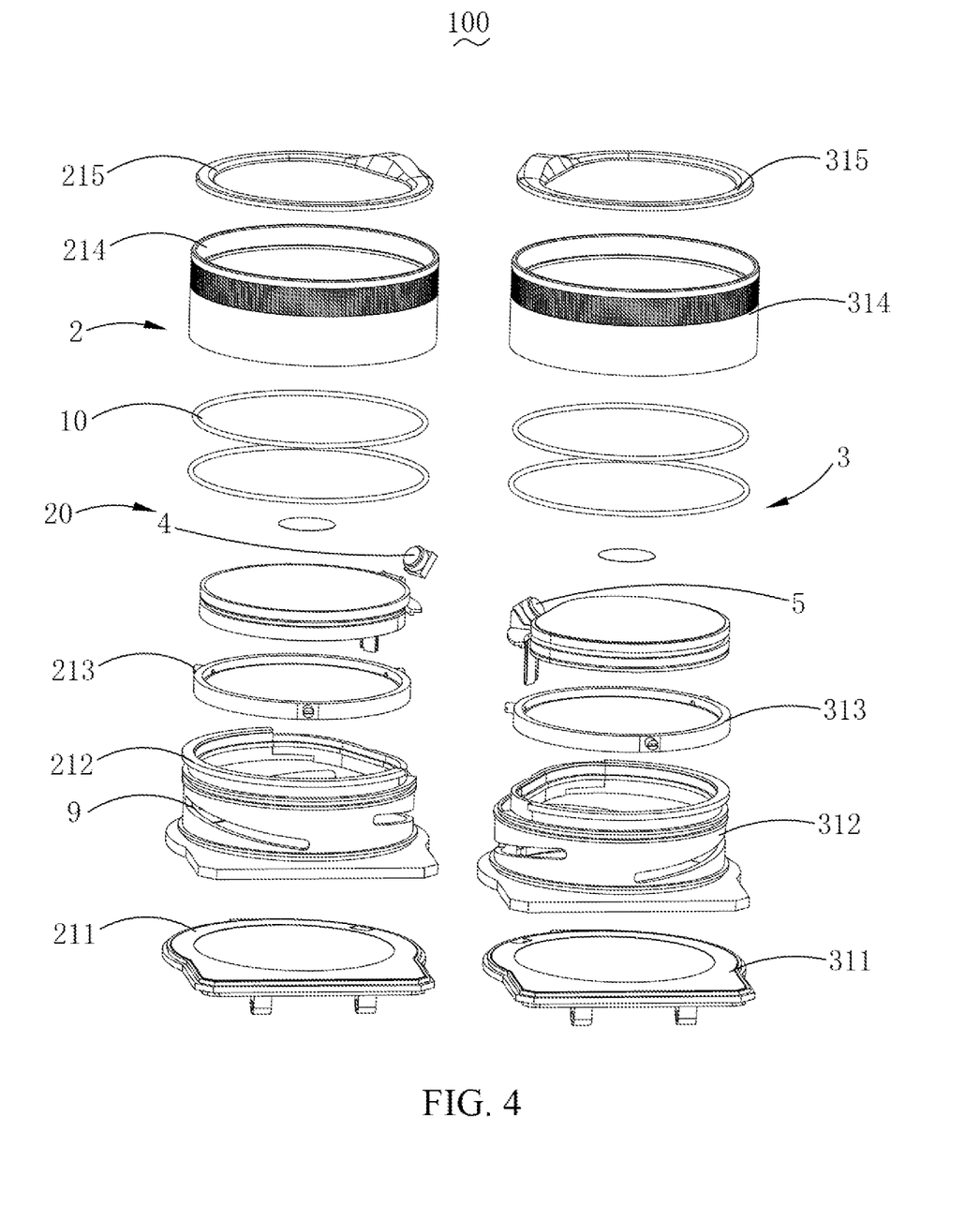
FIG. 4 is an exploded view of a first optical module and a second optical module shown FIG. 2.
Figure 5:
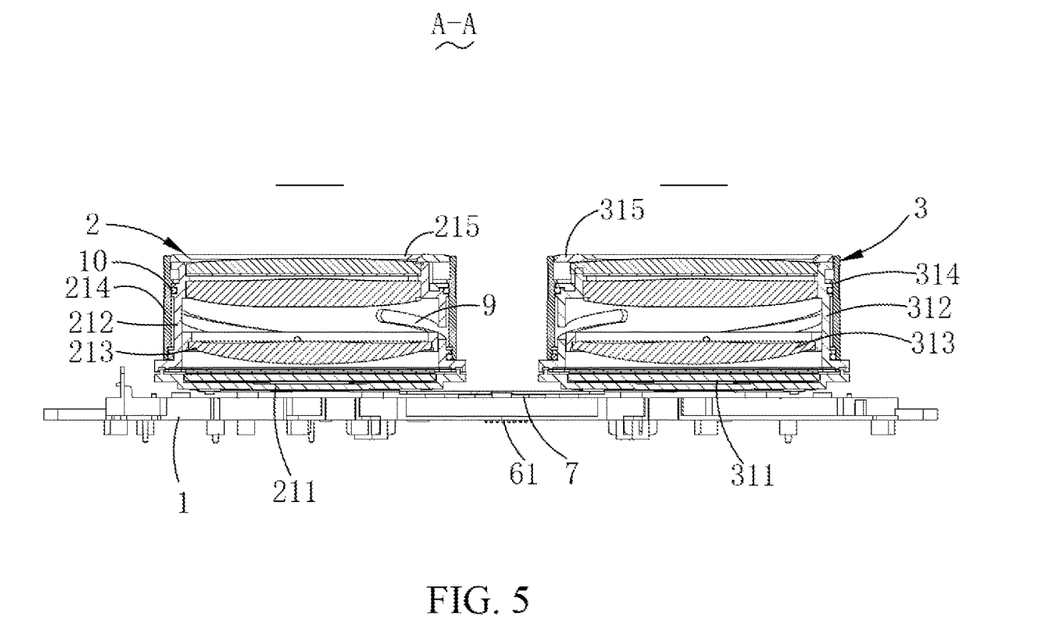
FIG. 5 is a cross-sectional view taken along line A-A shown in FIG. 1.
Figure 6:
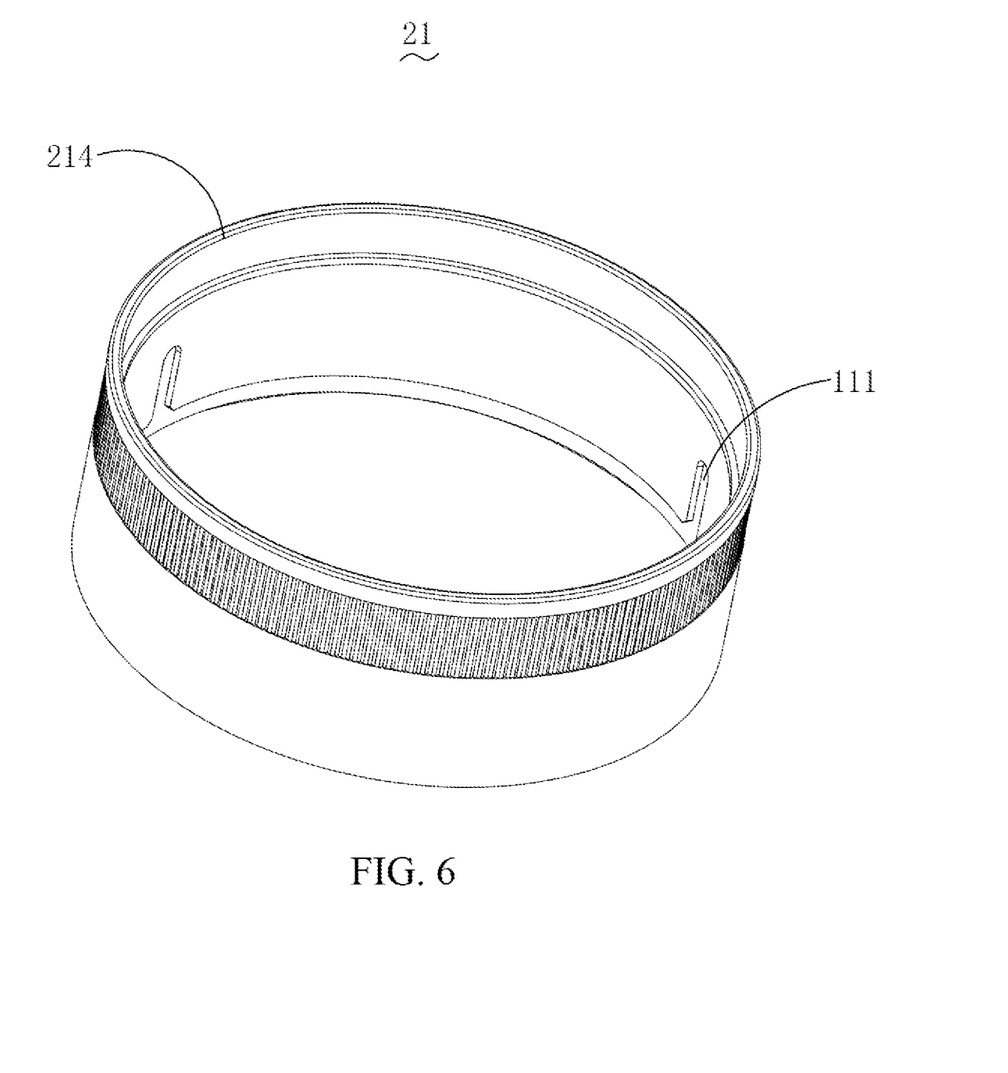
FIG. 6 is a schematic structural view of a first adjusting ring according to the present disclosure.

In some embodiments, the first optical unit 21 includes a first display assembly 211, a first barrel holder 212 fixed to a side of the first display assembly 211 away from the base 1, a first lens set 213 fixed in the first barrel holder 212, a first adjusting ring 214 sleeved on the first barrel holder 212, and a first infrared light ring 215 fixedly covering a side of the first barrel holder 212 away from the base 1. By rotating the first adjusting ring 214, the first lens set 213 is driven to rotate and move up and down, thereby adjusting a distance between the first lens set 213 and the first display assembly 211, and achieving manual adjustment on a diopter of the first optical unit 21. A plurality of guide slots 9 are formed in a sidewall of the first barrel holder 212 in a penetrating manner. An inner side of the first adjusting ring 214 is recessed to form a plurality of limiting slots 111. A number of the guide slots 9 is the same as a number of the limiting slots 111. An outer peripheral side of the first lens set 213 protrudes to form a plurality of shifting rods passing through the guide slots 9 and connected to the limiting slot 111. By rotating the first adjusting ring 214, the shifting rods push the guide slots 9, the first lens set 213 rotates with the guide slots 9 to move up and down, thereby adjusting a distance between the first lens set 213 and the first display assembly 211, and realizing adjustment of the diopter.

Two sealing rings 10 are further provided between the first adjusting ring 214 and the first barrel holder 212 for improving sealing performance between the first adjusting ring 214 and the first barrel holder 212. The sealing rings 10 are an O-shaped sealing ring 10 with desirable sealing performance.

The second optical unit 31 includes a second display assembly 311, a second barrel holder 312 fixed to a side of the second display assembly 311 away from the base 1, a second lens set 313 fixed in the second barrel holder 312, a second adjusting ring 314 sleeved on the second barrel holder 312, and a second infrared light ring 315 fixedly covering a side of the second barrel holder 312 away from the base 1. By rotating the second adjusting ring 314, the second lens set 313 is driven to rotate and move up and down, thereby adjusting a distance between the second lens set 313 and the second display assembly 311, and achieving manual adjustment on a diopter of the second optical unit 31. Since the first optical unit 21 and the second optical unit 31 have a same structure and a same working principle, descriptions will not be made herein.

Specifically, the first infrared light ring 215 and the second infrared light ring 315 are light-emitting diode light (LED) rings.

Embodiment 2

Referring to FIGS. 1-7, embodiments of the present disclosure further provide a method for automatically adjusting an IPD. The method is applied to the device 100 for automatically adjusting an IPD. The method includes the following steps.

Figure 7:
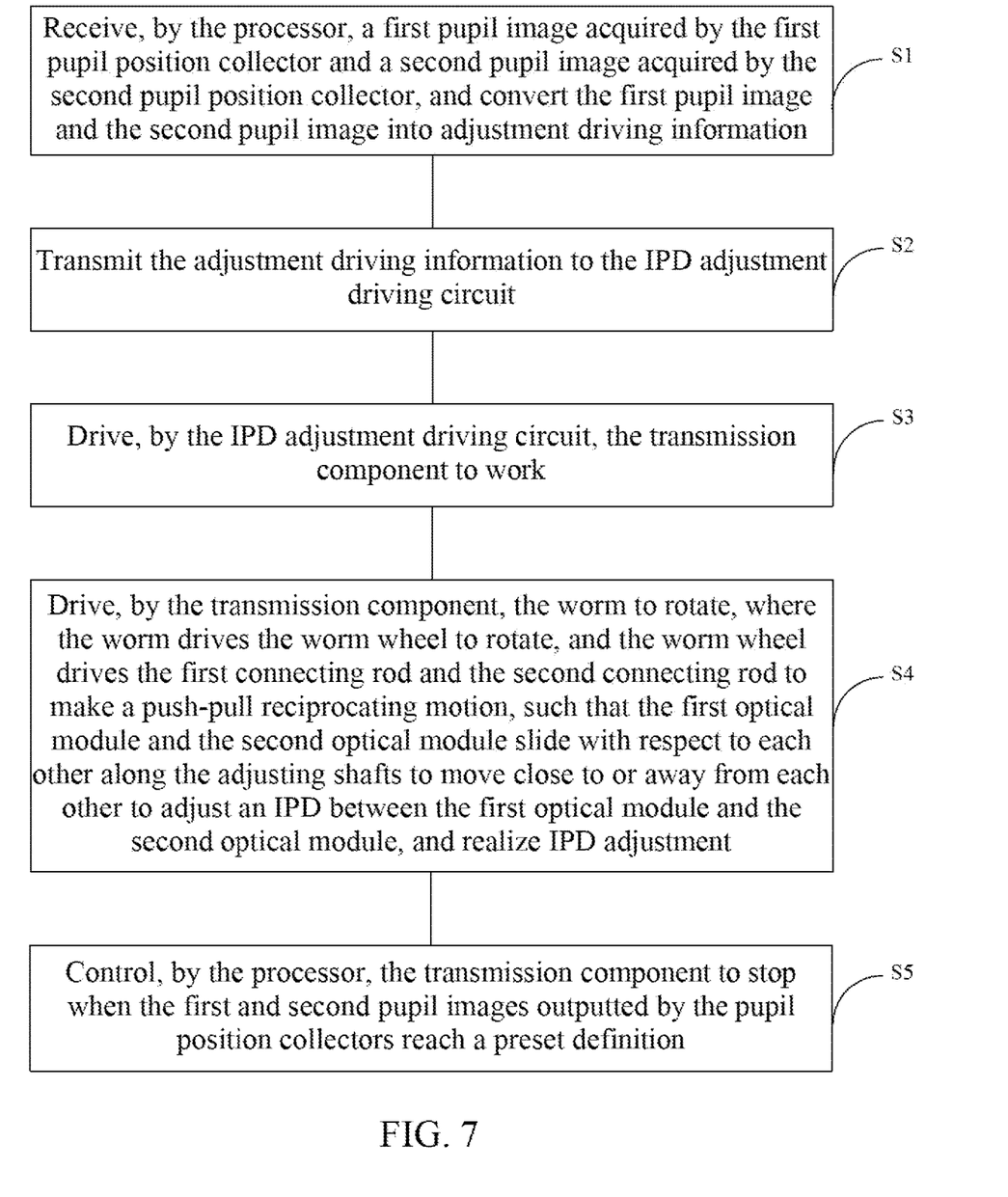
FIG. 7 is a flowchart of a method for automatically adjusting an IPD according to the present disclosure.

At S1: The processor receives a first pupil image acquired by the first pupil position acquisition unit 4 and a second pupil image acquired by the second pupil position acquisition unit 5, and converts the first pupil image and the second pupil image into adjustment driving information.

At S2: The adjustment driving information is transmitted to the IPD adjustment driving circuit.

At S3: The IPD adjustment driving circuit drives the transmission component 6 to work.

At S4: The transmission component 6 drives the worm 61 to rotate. The worm 61 drives the worm wheel 71 to rotate, and the worm wheel 71 drives the first connecting rod 74 and the second connecting rod 75 to make a push-pull reciprocating motion, such that the first optical module 2 and the second optical module 3 slide with respect to each other along the adjusting shafts 8 to move close to or away from each other to adjust an IPD between the first optical module 2 and the second optical module 3, and realize IPD adjustment.

At S5: When the first and second images outputted by the pupil position acquisition units reach a preset definition, the processor controls the transmission component 6 to stop.

Specifically, when the user wears the VR glasses, the first pupil position acquisition unit 4 and the second pupil position acquisition unit 5 respectively transmit a first pupil image and a second pupil image to the processor. According to the positions of pupils and positions of the infrared LEDs in the image reflected by eyeballs, the processor computes pupil positions, pupil sizes and IPD position information, and transmits IPD data to the IPD adjustment driving circuit.

In response to determining that the smart wearable VR device is correctly worn, the first pupil position acquisition unit 4 and the second pupil position acquisition unit 5 transmit a pupil position image. The processor acquires IPD position information and transmits IPD data to the IPD adjustment driving circuit. The IPD adjustment driving circuit drives a micro motor to rotate, thereby driving a worm on an output shaft to rotate. The IPD adjustment worm wheel 71 is driven to rotate accordingly. The worm wheel 71 drives the first connecting rod 74 (left connecting rod) and the second connecting rod 75 (right connecting rod) to make a push-pull reciprocating motion. The first connecting rod 74 and the second connecting rod 75 respectively push or pull the first optical module 2 and the second optical module 3 to move along the adjusting shafts 8, thereby realizing IPD automatic adjustment. In the field of smart wearable VR devices, the device 100 is suitable for all users. Without an IPD adjusting button such as a push button or a pull button, the appearance integrity of the smart wearable VR device is improved, and the assembly difficulty of the smart wearable VR device is reduced. Meanwhile, for different users, the device can quickly determine the IPD of the user and make quick and automatic adaptations for the different IPDs, thereby improving picture imaging of left and right eyes and achieving a better user experience.

Compared with the prior art, according to the device for automatically adjusting the IPD, two ends of the transmission assembly are respectively and rotatably connected to a side of the first optical module adjacent to the base and a side of the second optical module adjacent to the base. The processor is electrically connected to the IPD adjustment driving circuit and the pupil position acquisition assembly. The IPD adjustment driving circuit is electrically connected to the transmission assembly. The pupil position acquisition assembly is configured to acquire a pupil image displayed by the first optical module and the second optical module, and transmit the pupil image to the processor. The processor is configured to receive the pupil image and compute pupil positions, pupil sizes and IPD position information. The adjustment driving circuit is configured to receive the IPD position information from the processor, and drive the transmission component, thereby driving the first optical module and the second optical module to move close to or away from each other on the base to adjust an IPD between the first optical module and the second optical module, and realize IPD adjustment. In the field of smart wearable VR devices, the device is suitable for all users. Without an IPD adjusting button such as a push button or a pull button, the appearance integrity of the smart wearable VR device is improved, and the assembly difficulty of the smart wearable VR device is reduced. Meanwhile, for different users, the device performs adjustment automatically. It can quickly determine the IPD of the user and make quick and automatic adaptations for the different IPDs, thereby improving picture imaging of left and right eyes and achieving a better user experience.

The above described are merely implementations of the present disclosure. It should be noted here that those of ordinary skill in the art may make improvements without departing from the concept of the present disclosure, but such improvements should fall within the protection scope of the present disclosure.

What is claimed is:

1. A device for automatically adjusting an interpupillary distance (IPD), applied to virtual reality (VR) glasses, and comprising: a base, a first optical module slidably provided on the base, a second optical module slidably provided on the base, a pupil position acquisition assembly, a transmission assembly, an IPD adjustment driving circuit, and a processor, wherein the transmission assembly is supported on the base, rotatably connected to the base, and located between the first optical module and the second optical module, the transmission assembly comprises a first end rotatably connected to a side of the first optical module adjacent to the base and a second end rotatably connected to a side of the second optical module adjacent to the base, the processor is electrically connected to the IPD adjustment driving circuit and the pupil position acquisition assembly, and the IPD adjustment driving circuit is electrically connected to the transmission assembly, the pupil position acquisition assembly is configured to acquire a pupil image displayed by the first optical module and the second optical module, and transmit the pupil image to the processor, the processor is configured to receive the pupil image and compute pupil positions, pupil sizes and IPD position information, and the adjustment driving circuit is configured to receive the IPD position information from the processor, and cause the transmission assembly to drive the first optical module and the second optical module to move close to or away from each other on the base to adjust an IPD between the first optical module and the second optical module, and realize IPD adjustment.

2. The device as described in claim 1, wherein the pupil position acquisition assembly comprises a first pupil position acquisition unit fixed to the first optical module and a second pupil position acquisition unit fixed to the second optical module, the pupil image comprises a first pupil image displayed by the first optical module and a second pupil image displayed by the second optical module, the first pupil position acquisition unit is configured to acquire the first pupil image and transmit the first pupil image to the processor, and the second pupil position acquisition unit is configured to acquire the second pupil image and transmit the second pupil image to the processor.

3. The device as described in claim 1, wherein the base comprises a base body and a plurality of fixing members protruding and extending from the base body in a direction toward the first optical module and the second optical module, the first optical module comprises a first optical unit and a plurality of first sliding seats fixed to a side of the first optical unit adjacent to the base and spaced apart from one another, and the second optical module comprises a second optical unit and a plurality of second sliding seats fixed to a side of the second optical unit adjacent to the base and spaced apart from one another, and the automatic IPD adjusting device further comprises adjusting shafts extending along a movement direction of the first optical module and the second optical module and are opposite to each other, the adjusting shafts pass through the plurality of the fixing members and are fixedly supported by the plurality of the fixing members, and the plurality of first sliding seats and the plurality of second sliding seats are sleeved on and slidably connected to the adjusting shafts.

4. The device as described in claim 1, wherein the transmission assembly comprises a transmission component fixed to the base, a worm wheel rotatably provided on the base, a first connecting post and a second connecting post protruding from a side of the worm wheel away from the base and spaced apart from each other, a first connecting rod, and a second connecting rod, wherein the transmission component is in transmission connection with the worm wheel, the first connecting rod comprises a first end connected to the first connecting post and a second end connected to a side of the first optical module adjacent to the base, and the second connecting rod comprises a first end connected to the second connecting post and a second end connected to a side of the second optical module adjacent to the base.

5. The device as described in claim 4, wherein a connecting position at the second end of the first connecting rod and a connecting position at the second end of the second connecting rod are located on a straight line parallel to the adjusting shafts.

6. The device as described in claim 4, wherein the first connecting post and the second connecting post are symmetric with respect to a center of the worm wheel.

7. The device as described in claim 4, wherein the transmission component comprises a drive unit fixed to the base, and a worm fixedly connected to an output end of the drive unit, and wherein the worm is engaged with the worm wheel.

8. The device as described in claim 7, wherein the base further comprises an avoiding slot penetrating the base, and wherein a side of the worm adjacent to the base is suspended in the avoiding slot.

9. The device as described in claim 3, wherein the first optical unit comprises: a first display assembly, a first barrel holder fixed to a side of the first display assembly away from the base, a first lens set fixed in the first barrel holder, a first adjusting ring sleeved on the first barrel holder, and a first infrared light ring fixedly covering a side of the first barrel holder away from the base, and the second optical unit comprises: a second display assembly, a second barrel holder fixed to a side of the second display assembly away from the base, a second lens set fixed in the second barrel holder, a second adjusting ring sleeved on the second barrel holder, and a second infrared light ring fixedly covering a side of the second barrel holder away from the base.

10. A method for automatically adjusting an IPD, applied to the device as described in claim 4, and comprising:

receiving, by the processor, a first pupil image acquired by the first pupil position acquisition unit and a second pupil image acquired by the second pupil position acquisition unit, and converting, by the processor, the first pupil image and the second pupil image into adjustment driving information;

transmitting the adjustment driving information to the IPD adjustment driving circuit;

driving, by the IPD adjustment driving circuit, the transmission component to work;

driving, by the transmission component, the worm to rotate, wherein the worm drives the worm wheel to rotate, and the worm wheel drives the first connecting rod and the second connecting rod to make a push-pull reciprocating motion, such that the first optical module and the second optical module slide with respect to each other along the adjusting shafts to move close to or away from each other to adjust an IPD between the first optical module and the second optical module, and realize IPD adjustment; and controlling, by the processor, the transmission component to stop when the first and second pupil images outputted by the pupil position acquisition units reach a preset definition.

\* \* \* \* \*